(12) United States Patent
Burnett et al.

(10) Patent No.: US 8,874,719 B1
(45) Date of Patent: Oct. 28, 2014

(54) CONTEXT-AWARE NETWORK AND SITUATION MANAGEMENT FOR CRYPTO-PARTITIONED NETWORKS

(71) Applicant: Architecture Technology Corporation, Minneapolis, MN (US)

(72) Inventors: Benjamin L. Burnett, Prior Lake, MN (US); Deborah K. Charan, Minneapolis, MN (US); Fabio Pozzo, Eden Prairie, MN (US); Ranga Ramanujan, Hamel, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

(21) Appl. No.: 14/218,713

(22) Filed: Mar. 18, 2014

Related U.S. Application Data

(60) Provisional application No. 61/918,534, filed on Dec. 19, 2013.

(51) Int. Cl.
*G06F 15/16* (2006.01)
*H04L 12/24* (2006.01)
*G06F 12/00* (2006.01)

(52) U.S. Cl.
CPC .................................... *H04L 41/28* (2013.01)
USPC .......................................... 709/223; 709/250

(58) Field of Classification Search
USPC .................. 709/203, 217–218, 223–229, 250
See application file for complete search history.

(56) References Cited

U.S. PATENT DOCUMENTS

| | | | |
|---|---|---|---|
| 7,668,306 B2 * | 2/2010 | Strathmeyer et al. | 379/219 |
| 7,886,145 B2 * | 2/2011 | Smith et al. | 713/160 |
| 2009/0300198 A1 * | 12/2009 | Beers et al. | 709/230 |
| 2010/0098060 A1 * | 4/2010 | Strathmeyer et al. | 370/352 |
| 2012/0072727 A1 * | 3/2012 | Redlich et al. | 713/168 |

* cited by examiner

*Primary Examiner* — Zarni Maung
(74) *Attorney, Agent, or Firm* — Shumaker & Sieffert, P.A.

(57) ABSTRACT

This disclosure describes a context aware scalable dynamic network whereby network information concerning network elements in an untrusted (Black) network are gathered by network sensors, stored at a network sensor collector, and sent to another network sensor collector in a trusted (Red) network through a one-way guard. At the Red network, the network information from the Black network may be combined with network information from one or more Red networks. The combined network information may then be used to visualize a cross-domain network topology of both Red and Black networks, and to implement network management functions.

20 Claims, 11 Drawing Sheets

CONTEXT-AWARE NETWORK AND SITUATION MANAGEMENT FOR CRYPTO-PARTITIONED NETWORKS

This application claims the benefit of U.S. Provisional Application No. 61/918,534, filed Dec. 19, 2013, the entire content of which is incorporated by reference herein.

STATEMENT REGARDING FEDERALLY SPONSORED RESEARCH OR DEVELOPMENT

This invention was made with Government support under Contract FA9453-12-C-0093 with the United States Department of Defense. The Government may have certain rights in this invention.

TECHNICAL FIELD

This disclosure relates to network and situation management systems and techniques.

BACKGROUND

Entities such as the military, universities, schools, businesses and the like often use local networks that are operated in a plain text fashion. That is, because the devices communicating on the local networks are typically all in control by the same entity, such devices are trusted. Thus, no encryption is typically required on such a trusted network. However, entities may often control two or more local trusted networks that are not co-located. In order to transfer data between two separate trusted networks, it may be necessary to transfer such data through an untrusted network, such as the Internet. An arrangement in this manner may be referred to as crypto-partitioned networks.

One technique for transferring data from one trusted (Red) network to another trusted network is to use an encryption device to encrypt the data, send the data in packets through the untrusted (Black) network, receive the data on a decryption device at the target Red network, and decrypt those packets before reassembling the data packets into the original message. This is helpful in the event that the data packets are sensitive or classified in some way, as the data would be inaccessible and unreadable to an outsider in the Black network who may hack the network or attempt to alter the network or its properties in any way.

As Red networks are isolated from the Black network by an encryption device, any traffic on the Black network that originated from the Red network is encrypted. Likewise, any traffic coming into the Red network will need to include the appropriate encryption key to pass through the encryption device. Given this structure, gathering general data about the enterprise's network traffic and current situation in the Black network, and the management and visualization thereof, is difficult.

SUMMARY

In general, this disclosure describes techniques for network management, including visualization, in crypto-partitioned networks. In particular, in one example, this disclosure describes a context-aware, scalable, dynamic network in which information concerning network elements and current situational information in an untrusted (Black) network are gathered by network sensors, stored at a network sensor collector, and sent to another network sensor collector in a trusted (Red) network through a one-way guard. At the Red network, a network management device may combine the network information from the Black network with network information from one or more Red networks. The network management device may then use the combined network information to produce a visualization of a cross-domain network topology of both Red and Black networks, and to implement network management functions.

In one example of the disclosure, a method for providing network management comprises gathering first network information from one or more network sensors in a trusted network, storing the first network information from the trusted network in a first database, gathering second network information from one or more network sensors in an untrusted network, storing the second information data from the untrusted network in a second database, sending the second network information from the second database to the first database through a one-way guard and storing the second network information in the first database, and performing a network management function using the first network information and the second network information In another example of the disclosure, a system including a crypto-partitioned network configured for cross-domain network management comprises one or more first network sensors in a trusted network configured to gather first network information, a first network sensor collector configured to store the first network information from the trusted network in a first database, one or more second network sensors in an untrusted network configured to gather second network information, a second network sensor collector configured to store the second information data from the untrusted network in a second database, a one-way guard configured to send the second network information from the second database to the first database, and a visualizer configured to perform a network management function using the first network information and the second network information.

In another example of the disclosure, an apparatus for network management comprises a computing device located in a trusted network, the computing device executing a visualizer, the visualizer configured to access network information from a trusted network, access network information from an untrusted network, and fuse the network information from the trusted network with the network information from the untrusted network to form a cross-domain network topology.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
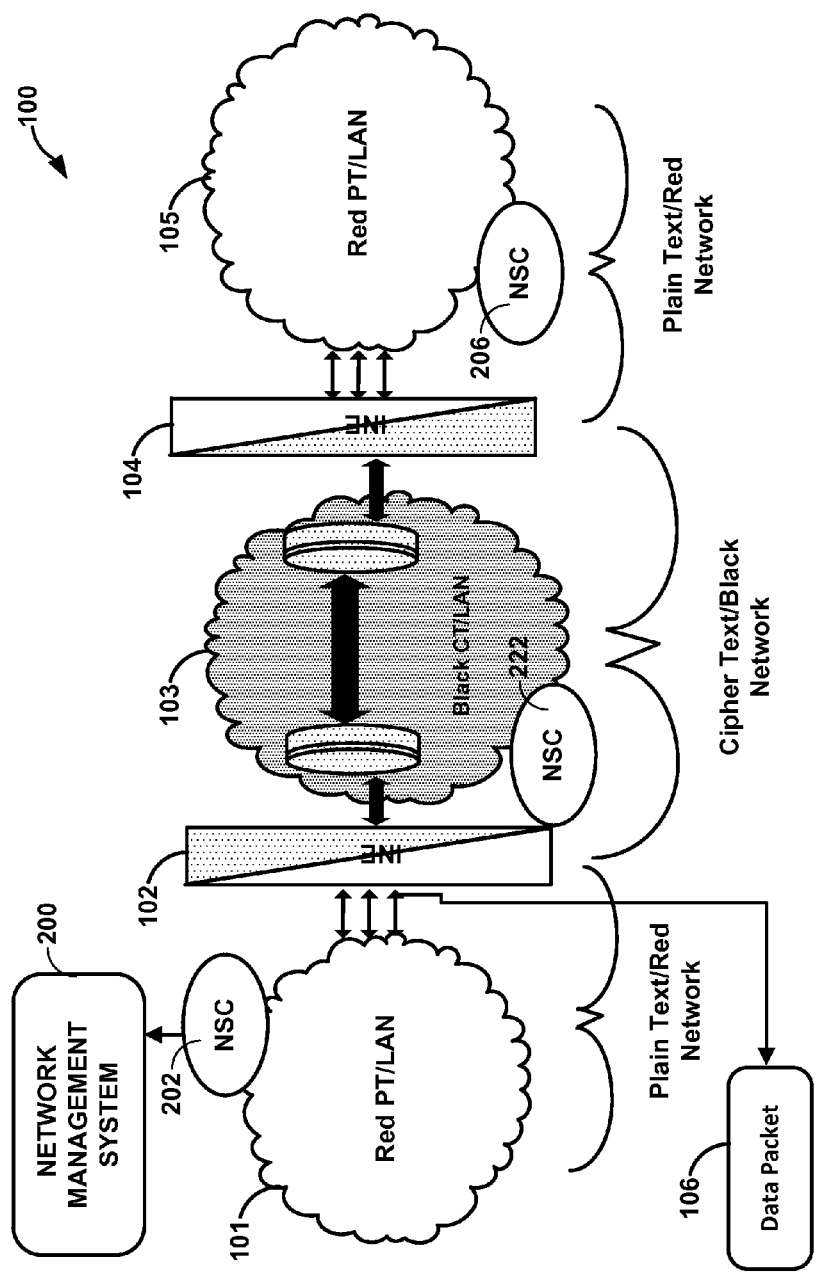
FIG. 1 is a system diagram illustrating a crypto-partitioned network.

FIG. 1 is a system diagram illustrating an example crypto-partitioned network 100. As shown in FIG. 1, an untrusted, cypher-text (CT) network 103 (Black CT/LAN) provides a communication path between two trusted, plain-text (PT) networks 101 and 105 (Red PT/LAN). A Red network typically communicates data packets in non-encrypted format, i.e. plain-text, because all devices in that network are viewed as trusted sources. These networks may be associated with a single entity or these networks may be associated with multiple trusted entities. Such Red networks are commonly used in military and government communications, though they can also be found in corporate networks, virtual private networks (VPNs), or home networks, among other networks. Conversely, Black networks may comprise any number of entities, including internet service providers, routers, etc. outside of the Red networks, or intermediary contacts, among other things. As such, because devices in a Black network are out of the control of users of a Red network, Red networks are typically configured to transmit data packets in encrypted format, i.e. cypher-text, to communicate over Black networks. An overall network scheme that uses both plain-text and cypher-text networks may be referred to as a crypto-partitioned network.

In the crypto-partitioned network 100 shown in FIG. 1, when a first Red network 101 communicates with a second Red network 105, the first Red network 101 creates data packet 106. The first Red network 101 sends data packet 106 to an in-line network encryptor (INE) 102 for encryption. INE 102 may be a High Assurance Internet Protocol Encryptor (HAIPE®) compliant device or some other sort of IP-based INE. Most of the bits in data packet 106 are encrypted during this process, but some configurations of INE 102 may keep certain bits unencrypted as a header before sending the data packet into Black network 103. Data packet 106 arrives at INE 104 and is decrypted, finally arriving at second Red network 105 in its original form. INE 104 may also be a HAIPE® compliant device or some other sort of IP-based INE.

As discussed above, in crypto-partitioned network 100, Red-side devices in separately located Red networks 101 and 105 are able to communicate with each other by using encryption (e.g., through INEs 102 and 104) to send data through the untrusted Black network 103. As such, network management devices and/or software in one Red network (e.g., Red network 101) are able to gather network statistics and information concerning network elements in any cooperating Red network (e.g., Red network 105, or any another Red networks that share encryption keys with each other), even if such Red networks are separated by one or more untrusted Black networks.

On the other hand, network management devices and/or software from Red network 101 are generally unable to gather network information and statistics concerning network elements in a Black network 103. This is because Black network devices are unable to decode any data or messages coming from a Red network 101. Furthermore, Black network devices are unable to directly send information to a Red network device. As such, Red-side devices are unable to employ network management and/or visualization techniques on Black-side devices, as network information concerning such Black-side devices is unavailable.

As can be seen from the discussion above, current technology for management of crypto-partitioned networks has major capability gaps. Current technology lacks the capability to provide an integrated network situational awareness picture by fusing network sensor data from the Black and Red sides of network. As such, there is no ability to gather and present mission context information to enable mission-aware network management.

In accordance with example techniques of the disclosure, crypto-partitioned network 100 in FIG. 1 may further include, among other things, a network sensor collector (NSC) 202 in Red network 101, an NSC 206 in red network 105, and an NSC 222. Each of the network sensor collectors may be configured to gather network information from one or more network sensors distributed through each network. These network sensors may gather information concerning the topology, traffic, and context of the traffic in each of their respective networks. This network information may be consolidated at one "master" NSC (e.g., NSC 202). Network management system 200 may then fuse the network information from Red network 101, Black network 103, and Red network 105 to form a complete topology of crypto-partitioned network 100, along with the network information that may be used to implement network management functions across crypto-partitioned network 100.

In this way, the methods, systems, and techniques of this disclosure provide for network management in a crypto-partitioned network. These methods, systems, and techniques include a context aware scalable dynamic network (CASDN) management system that may include the use of cross-domain (i.e., across both trusted (Red) and untrusted (Black) networks) network management and visualization tools. The methods, systems, and techniques of this disclosure may provide for a unified single-point interface for a network administrator to monitor and control the Black side, as well as the Red side of an INE-based enterprise network. Further benefits may include comprehensive cyber situational awareness for rapidly diagnosing network problems and implementing corrective actions.

Figure 2:
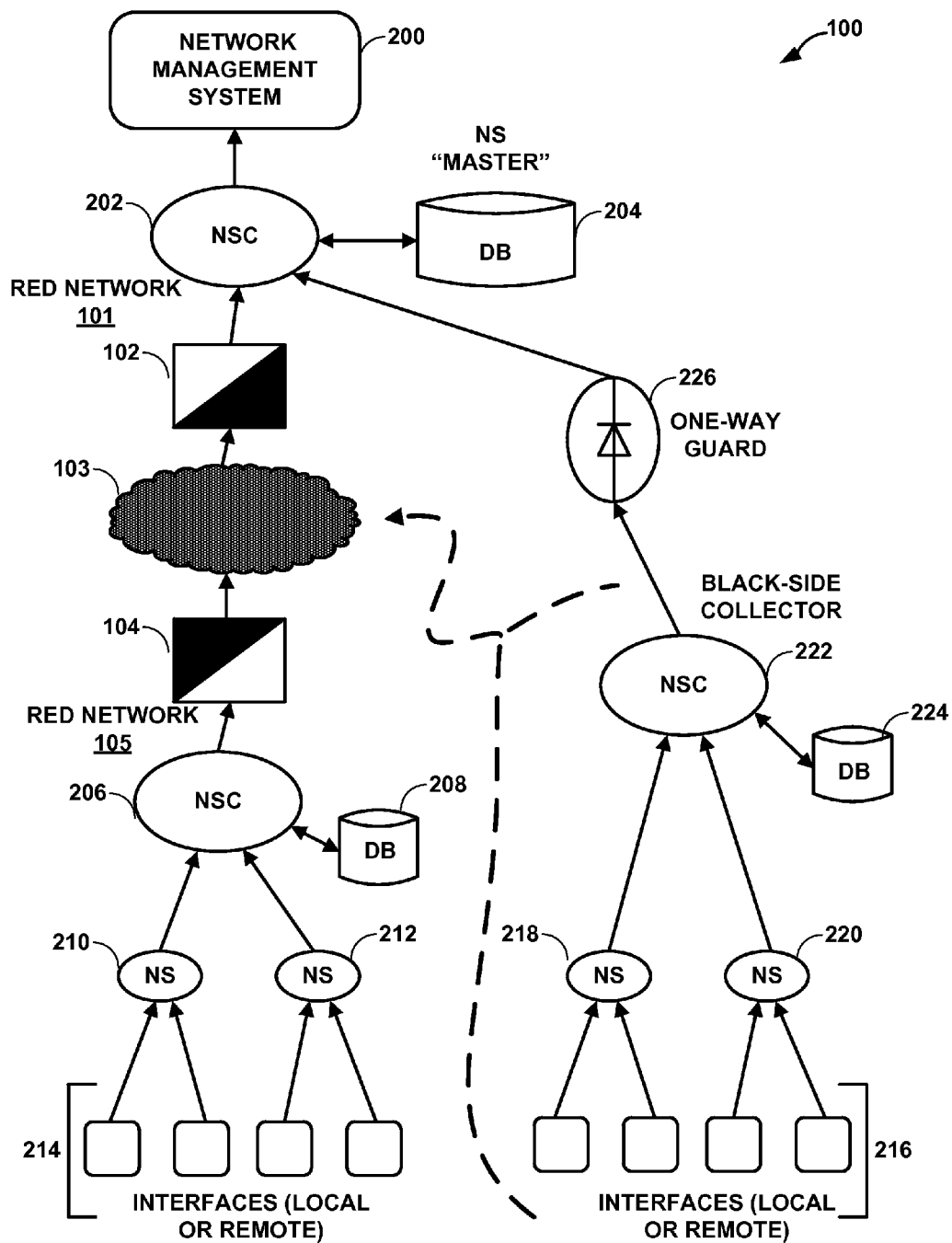
FIG. 2 is a block diagram illustrating an example crypto-partitioned network using the systems and techniques of this disclosure.

FIG. 2 is a block diagram illustrating an example crypto-partitioned network using the systems and techniques of this disclosure in more detail. Red network 105 may include one or more network sensors (NS), such as network sensors 210 and 212. Network sensors 210 and 212 may be configured as a dedicated hardware device, or software running on a multi-purpose computing device capable of communicating with network elements in Red network 105. Possible network elements in which network sensors 210, 212 may be implemented include INEs, routers, switches, or any other communication device communicatively coupled to red network 105.

Network sensors 210 and 212 may communicate with network elements located in Red network 105 through local or remote interfaces 214 to obtain network information. The types of network information that may be obtained may be any information concerning operational statistics of the network, including the IP address of the network element, the network element position (e.g., relative position to other network elements and/or physical coordinates of the network element, network element link status, amount of traffic at the network element, link bandwidth between network elements, traffic priority, and the like. The network information that is gathered may be in a format that is both augmentable and compressible (e.g., in an XML context format).

As discussed above, an interface with a network element is configured to obtain network information. Such an interface may be located at the network element itself (local) or may be aggregated at an interface that is not co-located with the network element (interface). One example of an interface that may supply network information is a NetFlow probe that is compliant with NetFlow network protocol developed by Cisco Systems. Example network information available from a NetFlow probe for a data packet may include the ingress interface (e.g., source IP address of the data flow, destination IP address of the data flow, IP protocol used, source port for other communication protocols, destination port for other communication protocols, and IP types of service). NetFlow is a network management protocol for collecting IP traffic information. SNMP (simple network management protocol) is also a protocol used for managing network elements, and provides the querying and setting of network management data.

Network sensors 218 and 222 send the collected network information to one or more network sensor collectors (NSCs) 206 in Red network 105. In FIG. 2, NSC 206 collects the network information from network sensors 210 and 212 and stores the network information in database (DB) 208. NSC 206 may be implemented in a server, laptop computer, desktop computer, or any other computing device capable of communicating with network sensors. NSC 206 may be further configured to send the network information stored in database 208 to NSC 202 in Red network 101 for storage in NS Master Database 204. Communication of such network information may be performed through INEs 104 and 102 through Black network 103 using standard cryptographic techniques (e.g., cryptographic techniques compliant with a HAIPE®). Though not shown in FIG. 2, NSC 202 may also gather network information from network sensors in Red network 101 and also store that network information in NS Master DB 204.

Like Red network 105, Black network 103 may include one or more network sensors (NS), such as network sensors 216 and 220. Like the network sensors in a Red network, network sensors 218 and 220 may be configured as a dedicated hardware device, or software running on a multi-purpose computing device capable of communicating with network elements in Black network 103. Like the Red network, possible network elements in Black network 103 may include INEs, routers, switches, servers, desktop computers, laptop computers, tablet computers, mobile phones, or any other communication device communicatively coupled to Black network 103 having an IP address.

Network sensors 218 and 220 may be implemented in routers, gateways, switches, INEs, or any other network element. Network sensors 218 and 220 may communicate with network elements through local or remote interfaces 216 to obtain network information. The types of network information that may be obtained may be any information concerning operational statistics of the network, including the IP address of the network element, the network element position (e.g., relative position to other network elements and/or physical coordinates of the network element, network element link status, amount of traffic at the network element, link bandwidth between network elements, traffic priority, and the like). Network sensors 218 and 220 may collect the network information from local or remote interfaces 216 in the same manner as discussed above with reference to interfaces 214.

Network information collected by the network sensors may be sent to one or more network sensor collectors (NSC) 222 deployed within Black network 103. In the example of FIG. 2, NSC 222 collects the network information from network sensors 218 and 220 and stores the network information in database (DB) 224. NSC 222 may be implemented in a router, gateway, switch, or any other network element. NSC 222 may be further configured to send the network information stored in database 224 to NSC 202 in Red network 101 for storage in NS Master Database 204. However, communication of such network information may not be performed through INE 102, as devices in Black network 103 do not have access to the necessary cryptographic keys.

In one example, in order to communicate information from Black network 103 to Red network 101 without compromising the security integrity of the Red network, one-way guard 226 provides one-way, Black-to-Red communication of network information stored on an NSC (222) in a Black network (103) to an NSC (202) in a Red network (101). One-way guard 226 is a device (e.g., a dedicated hardware device or software implemented on a programmable computing device) that only allows communication of well-defined data from one domain to another domain in one direction per ruleset (e.g., ruleset XX for data type Y from a Black network to a Red network, then a separate ruleset AA for data type B from a Red Network to a Black network), without requiring encryption. In general, a one-way guard usually allows data flow from a lower security network to a higher security network. In the example of FIG. 2, no communication from Red network 101 to Black network 103 through one-way guard 226 is shown. The only way Red network 101 may communicate through Black network 103, is through INE 102.

In other examples, certain types of data may be allowed to flow through one-way guard 226 from a higher security network (e.g., Red network 101) to a lower security network (e.g., another Red network at a lower security level, or Black network 103). For example, one-way guard 226 may be configured with a ruleset that allows configuration information for network sensors and network sensor collectors to flow through one-way guard 226. Other types of data (e.g., regular communication) would still flow through an INE, but not across domains (e.g., from red to black or black to red).

As mentioned above, the network information gathered from both Red and Black networks may include the IP address of the network elements in each network. As can be seen in FIG. 2, INE 102 and 104 define the "edges" of each of the networks 101, 105. As such, an IP address and/or MAC address for INE 102 will be included in the network information for both Red network 101 and Black network 103. For example, in the case that INE 102 comprises one or more network interface cards (NICs) facing both Red network 101 and Black network 103, INE 102 will have one or more IP addresses and MAC addresses that are visible to devices in Red network 101, and will have one or more different IP addresses and MAC addresses that are visible to devices in Black network 103. Likewise, the IP address for INE 104 will be included in the network information for both Red network 105 and Black network 103. As such, network management system 200 in Red network 101 may use the network information stored in NS Master DB 204 to "fuse" together the network information for the various Red and Black networks gathered at that database. Network management system 200 may be implemented in software executing on a computing device connected to Red network 101.

In this context, fusing may refer to the process of correlating network information for both Red and Black networks so that the relative location, traffic information, and other related network information for network elements in both Red and Black networks may be queried, visualized, and managed in a single comprehensive network management and visualization tool (e.g., network management system 200). As opposed to previous network management techniques in crypto-partitioned networks, where only Red network information could be visualized and managed from a device in the Red network, the techniques of this disclosure allow for the simultaneous visualization and management of network elements in both Red and Black networks.

Figure 3:
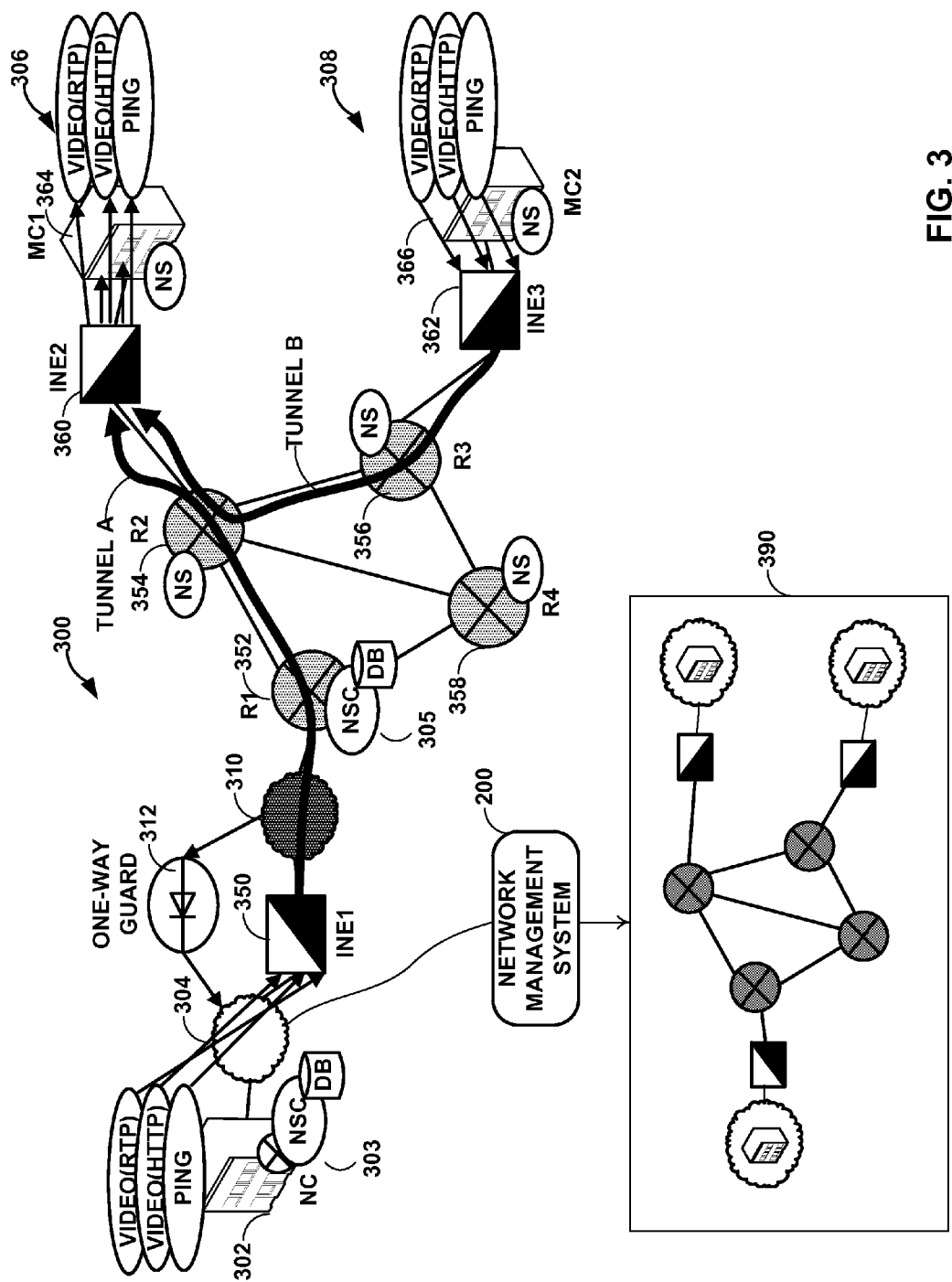
FIG. 3 is a conceptual diagram illustrating techniques for fusing network information across crypto-partitioned networks.

FIG. 3 is a conceptual diagram showing how network management system 200 may be further configured to correlate the network information from Red networks (304, 306, and 308) to the network information from Black network 310 in order to fuse network topologies and data flows. FIG. 3 shows an example crypto-partitioned (cross-domain) network 300. Crypto-partitioned network 300 includes a network center (NC) 302 that communicates over a Red network 304 through INE1 350 to a Black network 310. Black network 310 includes interconnected routers R1 352, R2 354, R3 356, and R4 358. Router R2 354 connects to mission center 1 (MC1) 364 through INE2 360. MC1 364 is in Red network 306 that is separately located from the NC 302 in Red network 304. Likewise, router R3 356 connects to mission center 2 (MC2) 366 through INE3 362. As such, MC2 366 is located in Red network 308 that is also separately located from the NC 302 in Red network 304 and the MC1 364 in Red network 306. Such separately located Red networks are sometimes referred to as Red enclaves.

In accordance with the techniques of this disclosure, and as illustrated in FIG. 2, each of Red networks 304, 306 and 308, and Black network 310 may include network sensors (NS) and network sensor collectors (NSC) installed on network elements in the respective networks. Network sensors are shown at each of MC1 364 and MC2 366. Rather than having a separate NSC in each of these Red enclaves, the NSes at MC1 364 and MC2 366 are configured to communicate across the Black network 310 using encryption techniques provided for by the INEs. As such, network information from the MC1 NS and the MC2 NS may be gathered and stored at NSC 303 at NC 302.

In Black network 310, an NS is installed at or near each of routers R2 354, R3 356, and R4 358. Each of these NSes gathers network information related to their respective routers, as well as any other network elements visible from the respective NSes. Furthermore, a black-side NSC 305 is installed at or near router R1 352. It should be noted that, in addition to collecting network information from NSes, NSC 305 may also be configured to collect network information itself. Also, it should be noted that the location of the NSes and NSC 305 in FIG. 3 is merely one example. NSC 305 may be located at any position and connected to network elements in black network 310.

FIG. 3 further illustrates traffic flows that have been started over the crypto-partitioned network 300. The traffic flows may include a variety of different traffic types including ping traffic, video traffic using hyper text transfer protocol (HTTP), and video traffic using real-time transport protocol (RTP). Note that other types of data traffic could also be used. In the example of FIG. 3, data traffic is being sent to MC1 364 from MC2 366 and NC 302.

One-way guard 312 allows network information stored at NSC 305 at router R1 352 to be sent to NSC 303 at the NC 302. At this point, through network information gathered by the NSes in each Red enclave and in Black network 310, a network management system 200 in Red network 304 utilizes network information gathered by NSC 303 at the NC 302 to provide a topology for the Red enclaves and Black network 310. Since MAC and/or IP addresses of both the Black and Red side of INEs 350, 360 and 362 may be included in both the Red enclave network information and the Black network information, the MAC and/or IP addresses of the INEs may be used to fuse the topologies of the Red and Black networks and provide a visualization of the entire cross-domain network. The process by which network management system 200 fuses the network topologies will be discussed in more detail below.

NSCs and NSes in Black network 310 gather network information concerning Tunnel A between INE1 350 and INE2 360. Tunnel A may be a data tunnel including data flows for one or more payload protocols (e.g., video RTP, video HTTP, and Ping, as shown in FIG. 3). The network information may include an origination IP address and/or MAC address (e.g., the IP address of INE1 350) and a destination IP address and/or MAC address (e.g., the IP address of INE2 360). The black-side NSCs and NSes may determine the Black-side IP address and/or MAC address of INE1 350 and INE2 360 using SNMP, ARP protocol or traffic analysis.

In addition, the NSes and NSCs in Black network 310 may also detect the IP addresses and/or MAC addresses of any routers that Tunnel A passes through between INE1 350 and INE2 360 (e.g., router R1 352 and router R2 354). The network information may further include the entire bandwidth used by Tunnel A. Note that because the contents of Tunnel A are encrypted by INE1 350, any Black network NSes and NSCs would not be able to determine the content or context (e.g., payload format) of specific flows within the tunnel.

NSes and NSCs in Red networks 304 and 306 gather network information concerning individual flows (e.g., the video RTP, video HTTP, and Ping flows) between NC 302 and MC1 364. Unlike Black-side NSes and NSCs, Red-side NSes and NSCs gather network information concerning the origination IP address (e.g., NC 302) and destination IP address (e.g., MC1 364) for each of the individual flows. The Red-side NSes and NSCs are also configured to determine the IP addresses and/or MAC addresses of the Red-side of INE1 350 and INE2 360. Again, in some examples, the Red-side NSCs and NSes obtain the IP addresses and/or MAC addresses of the INEs using SNMP or ARP challenges, traffic Analysis. In other examples, the Red-side NSC and NSes may be configured to access an INE device interface (e.g., a web interface) to obtain Red-side MAC addresses, IP addresses, and/or port numbers of the INE, or, in some cases, both Red-side and Black-side MAC addresses, IP addresses, and/or port numbers of the INE. In other examples, the Red-side NSC and NSes may be configured to access the tunnel definitions containing both IP and MAC addresses and port numbers of both endpoints of the tunnel.

Figure 4:
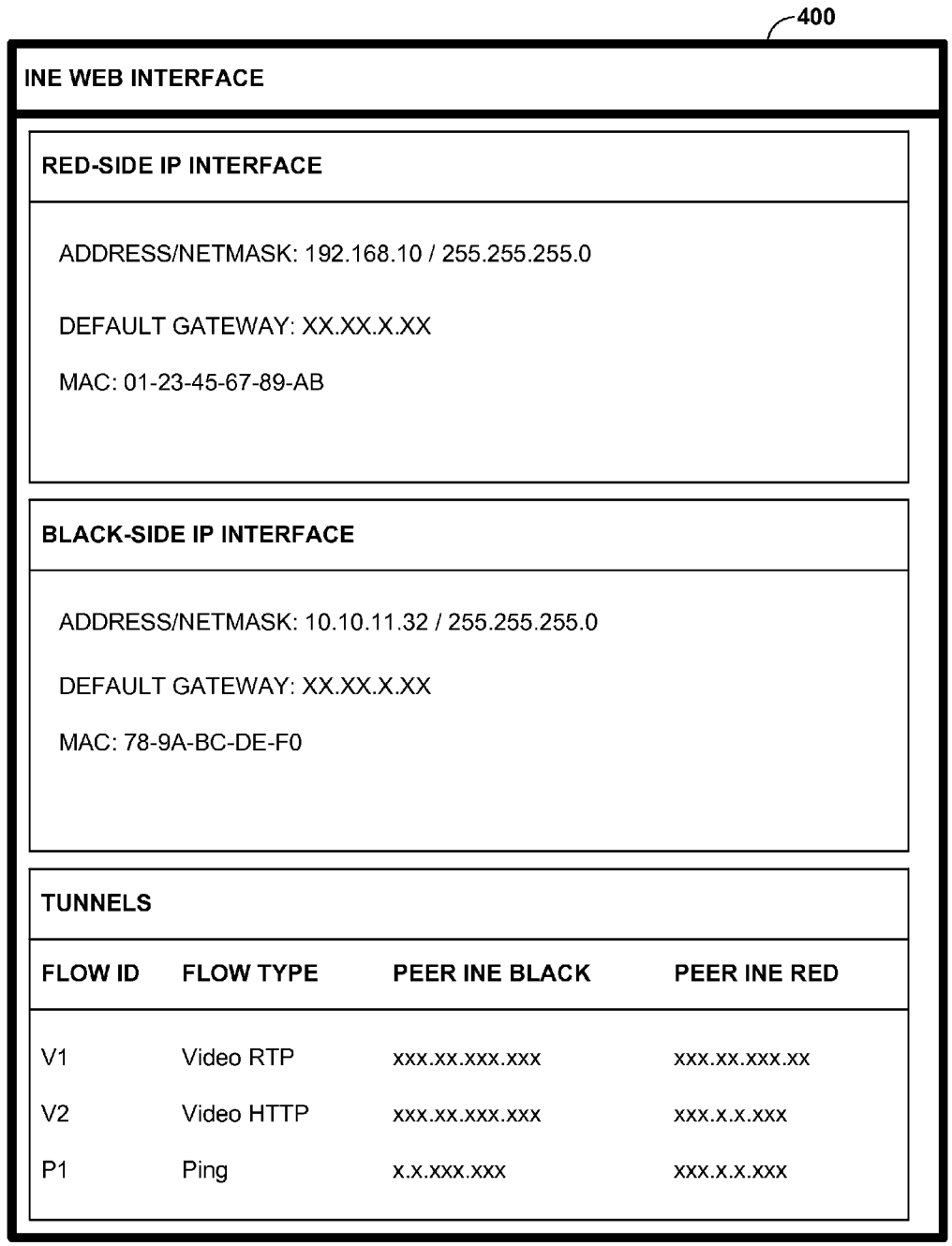
FIG. 4 is a conceptual diagram illustrating an example web interface of an in-line network encryptor.

FIG. 4 is a conceptual diagram illustrating an example web interface 400 of INE1 350. Web interface 400 is an example of a user interface that can be accessed to view operation information concerning an INE. Typically, web interface 400 may be accessed and viewed by a network administrator (e.g., using a username and password) in order to obtain information concerning the operation of an INE. As shown in FIG. 4, web interface 400 may include information concerning one or more Red-side IP interfaces of the INE and one or more Black-side interfaces of the INE. As shown in FIG. 4, the Red-side and Black-side IP address sections of web interface 400 may include, among other things, the IP address and netmask, the default gateway, and the MAC address. Of course, other information may be available, including the specifics of IPv4 and IPv6 interfaces, local networks, routers, neighbors, Security Parameter Indexes (SPI) of flows, multicast settings and configuration and device status (e.g., condition, temperature, etc.).

In accordance with example techniques of this disclosure, network sensors, network sensor collectors, and/or network management system 200 may be configured to access both Red-side and Black-side IP interface information from an INE web interface. In one example, the network sensors may be configured to store a username and password for accessing an INE web interface. Once a network sensor gains access to the web interface, IP interface information for the INE may be downloaded (e.g., using an HTTP interface or a textual data export) by the network sensor, sent to a NSC for collection, and ultimately forwarded to network management system 200.

In addition, to obtain IP interface and tunnel information of local and remote INE devices, a network sensor may be further configured to export textual data concerning data flows placed into tunnels by the INE. The data flow textual information may include an identification for the flow, a flow type (e.g., context) of the flow, the TCP/IP port number of the flow, the Black-side address of the destination INE (Peer INE Black in FIG. 4) and the red-side address of the destination INE (Peer INE Red in FIG. 4). In this way, a Red-side network sensor may gather network information concerning what data flows are placed into each tunnel.

Returning to FIG. 3, once network information concerning the IP and/or MAC address of each side of the INEs is determined, network management system 200 may correlate the Black-side tunnel (e.g., Tunnel A) that traverses from the Black-side address of INE1 350 to the Black-side address of INE2 360 to be equivalent to a flow from the Red-side address of INE1 350 to the red-side address of INE2 360. That is, because the Red and Black side IP addresses of a single INE are known, network management system 200 may determine the edges of each of the Red enclaves and Black network 310.

Network management system 200 may then compare flow subnets of Red-side endpoints in Red network 304 and Red network 306. For example, network management system may match the subnets for the video (RTP), video (HTTP), and ping data flows between NC 302 and the Red-side of INE1 350. Likewise, network management system may match the subnets from the video (RTP), video (HTTP), and ping data flows between the Red-side of INE2 360 and MC1 364. Because network management system 200 has already determined the corresponding Black-side addresses of INE1 350 and INE2 360, network management system 200 may then determine that the video (RTP), video (HTTP) and ping flows in Red Network 304 and Red Network 360 are contained within Tunnel A in Black network 310. It should be noted that similar techniques may be used for fusing network topologies for data flows going from MC2 366 to MC1 364 (i.e., Tunnel B). Since all network information is collected at an NSC, the network management system need not be in any specific red enclave, but may be located in any Red enclave so long as network management system 200 has access to collected network information in the NSC.

Since Black-side network information already indicates that Tunnel A traverses through router R1 352 and Router R2 354, network management system 200 may fuse the topologies of both the Red and Black networks to show the flow of data, including encrypted Tunnels A and B across the entirety of crypto-partitioned network 300. Once network management system 200 fuses the topologies, Red-side data flows (e.g., video (RTP), video (HTTP), ping) flows may be mapped onto Black-side data flows (e.g., Tunnel A and Tunnel B). The data flows may then me mapped to the topologies and shown for visualization on user interface 390.

Using the techniques of this disclosure, additional network management functions are also available by having a cross-domain network topology. For example, one network management function may be an overlay routing service for situations where broken links are detected.

Based on the foregoing description, in one example of the disclosure an apparatus for network management may include a computing device located in a trusted network, the computing device executing a network management system 200 wherein the network management system 200 is configured to access network information from a trusted network (e.g., Red network 105 of FIG. 2), access network information from an untrusted network (e.g., Black network 103 of FIG. 2), and fuse the network information from the trusted network with the network information from the untrusted network to form a cross-domain network topology. The network information may include one or more of network element IP addresses, network element position, network element link status, amount of traffic at the network element, link bandwidth between network elements, traffic priority of flows, application name sending and/or receiving traffic, username using the application, and other data about the elements, applications, CPU and users in the network.

In another example of the disclosure, a method for providing network management comprises gathering first network information from one or more network sensors (e.g., network sensors 210 and 212, FIG. 2) in a trusted network (e.g., Red network 105, FIG. 2), storing the first network information from the trusted network in a first database (e.g., DB 208), then forwarding it to a "master" database 204, gathering second network information from one or more network sensors (e.g., network sensors 218 and 220) in an untrusted network (e.g., Black network 103), storing the second information data from the untrusted network in a third database (e.g., DB 224), sending the second network information from the third database 224 to the "master" database 204 through a one-way guard 226 and storing the second network information in the "master" database 204, and performing a network management function (e.g., with network management system 200) using the first network information and the second network information.

The one or more network sensors 210 and 212 in the Red network 105 and the one or more network sensors 218 and 220 in the Black network 103 gather information from at least one of a probe and an interface 214 and 216 that is communicatively coupled with a network element. The network element may be one or more of an inline network encryptor, a router, a switch, and other network elements and the network information includes one or more of network element IP address, network element position, network element link status, amount of traffic at the network element, link bandwidth between network elements, traffic priority of flows, application name sending and/or receiving traffic, username using the application, and other data about the elements, applications, CPU and users in the network.

In another example of the disclosure, performing the network management function comprises network management system 200 performing a visualization function, the visualization function showing one or more of a topology of the untrusted network and the trusted network, network element relative position, network element location, link status, amount of traffic, number of flows, relative sizes of flows, breakdown of traffic types and subtotals and relative size of traffic for each type, etc. In another example of the disclosure, network management system 200 performs the visualization function by fusing the first network information with the second network information.

Figure 5:
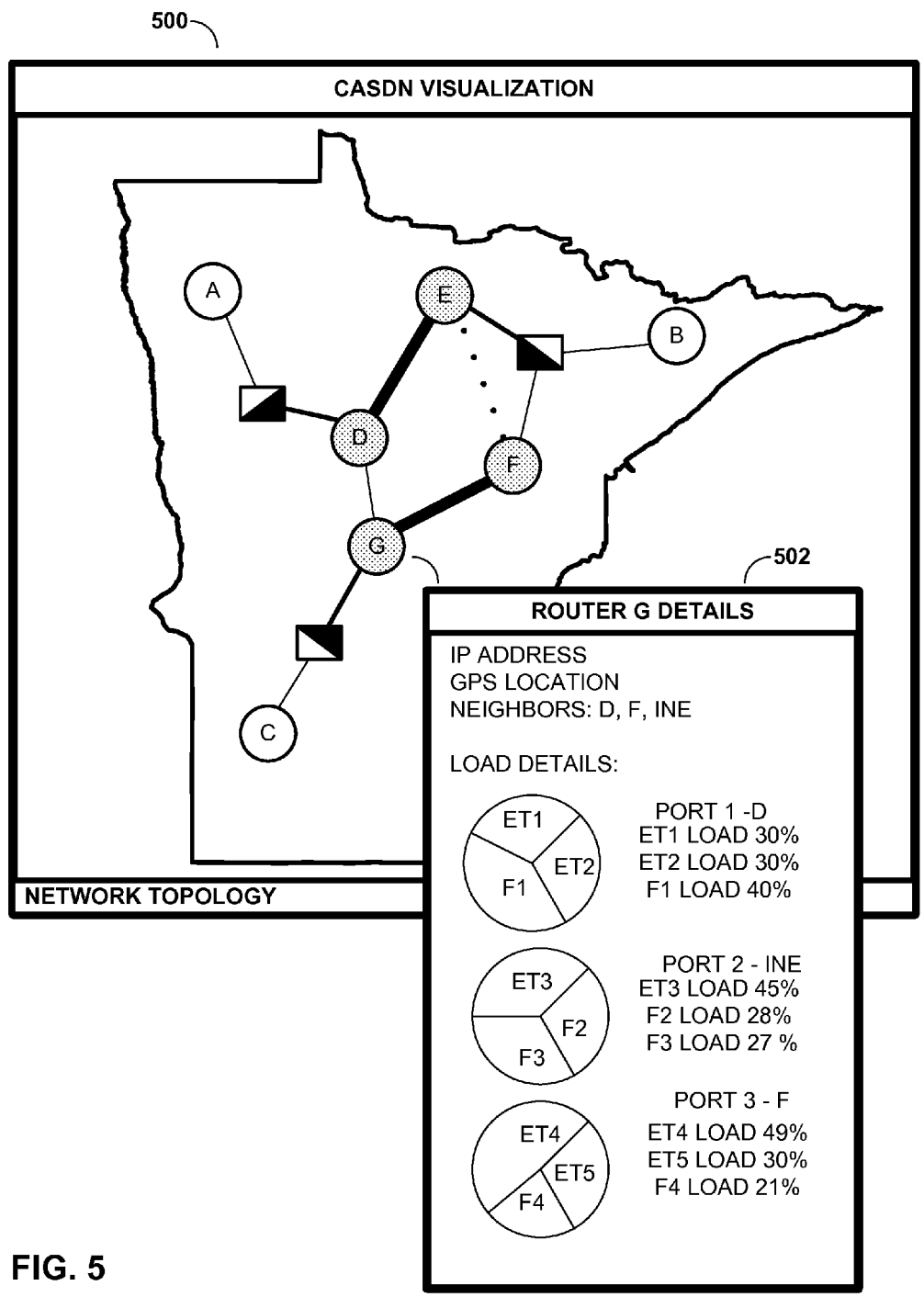
FIG. 5 is a conceptual diagram illustrating an example user interface generated by a network management system using the techniques of this disclosure.

FIG. 5 is a conceptual diagram illustrating an example user interface presented by a network management system 200 according to example techniques of this disclosure. In this example, FIG. 5 shows example visualization window 500 that may be displayed by network management system 200 with fused information collected from Black and Red networks (e.g., Red networks 304 and 306, and Black network 310). Network management system 200 may generate window 500 to show a network topology of a crypto-partitioned network located in the state of Minnesota. In one example, the network topology may be shown against a satellite map, e.g., the National Aeronautics and Space Admiration's (NASA) World Wind mapping system.

As can be seen in FIG. 5, network management system 200 generates the network topology to depict the relative locations of network elements A-G, as well as the coordinates (e.g., latitude/longitude coordinates) of the network elements within Minnesota. Network elements A, B and C represent Red networks located behind INEs. For example, each of network elements A, B, and C may represent one or more computing devices within a Red network at a particular location (e.g., a command center, building, school, business, etc.). Network elements D, E, F and G represent routers within an untrusted Black network sitting between each of the Red networks.

In FIG. 5, network management system 200 may construct lines in visualization window 500 to show links between network elements A-G, and the INEs. Network management system 200 draws a solid or blue line to depict an active, working data link, and draws a red or dashed line to represent a data link that is currently not available (e.g., broken, being repaired, overloaded, etc.). Note: the solid/dashed or color settings of the line and the meaning can be configured by the user. Network management system 200 may be configured to adjust the width of each line to represent a relative amount of data traffic on the link. For example, the wider the line the more data is being carried on the link. Network management system 200 may continuously (e.g., in near real-time) or periodically update the width of the lines depicted in the visualization to indicate changes in the amount of traffic over links, and the link status, or amount of a specific protocol, or other configurable values. Furthermore, network management system 200 may automatically add and map to visualization window 500 any additional network elements (e.g., routers, INEs, etc.) that may be discovered by network sensors in a Red or Black network. When a location is not available for a network element, one may be calculated based on the location of a neighbor network element.

Network management system 200 may generate visualization window 500 such that each of the depicted network elements (e.g., INEs, routers, Red networks, and other network elements) and link lines may be selectable by a user to show additional network information gathered by the network sensors. For example, as shown in FIG. 5, network management system 200 may cause an additional window 502 to be displayed when a user selects Router G. Window 502 may display information concerning router G, including its IP address, GPS location, neighboring network elements that router G links to, as well as traffic load details for the ports of the router. In other examples, network management system 200 may cause other information to be displayed, including NetFlow data, SNMP query data (e.g., INE SNMP data, SNMP data from various network devices like routers, switches, or printers), computing node data (e.g., user, process and CPU data), platform status data (vehicle position, fuel status, condition, etc.), or other context data (e.g., mission data, target location data, etc.).

As shown in FIG. 5, network management system 500 may cause window 502 to show traffic load details broken down by port for router G. Each port is further broken down by data flow. For example, port 1 is shown to be servicing two encrypted tunnels (ET1 and ET2) as well as one unencrypted flow (F1). Network management system 200 indicates the percentage of bandwidth each of these data flows represents for port 1 of router G. Similarly, router G port 2 is depicted as including one encrypted tunnel (ET3) and two unencrypted flows (F2 and F3), while port 3 is depicted as including two encrypted tunnels (ET4 and ET5) and one unencrypted flow (F4). Each of the encrypted tunnels and unencrypted data flows may represent a flow of data from an originating IP address to a destination IP address.

Figure 6:
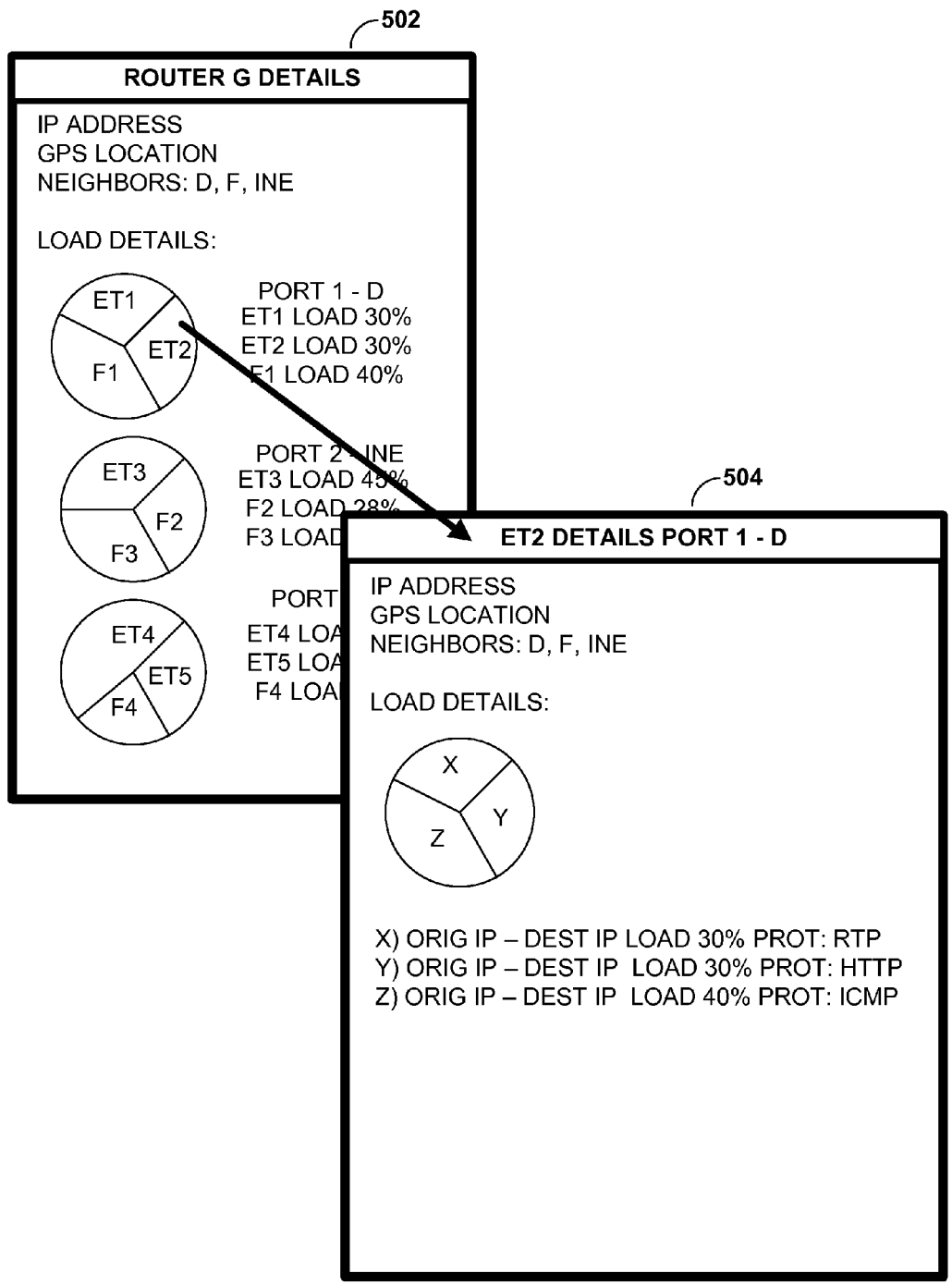
FIG. 6 is a conceptual diagram illustrating another example user interface generated by a network management system using the techniques of this disclosure.

In a further example, network management system 200 may be further configured to cause each of the data flows shown in window 502 to be selectable. Upon selection by a user, network management system 200 may cause a further window to be displayed to show additional information concerning the particular data flow. For example, FIG. 6 shows an example user interface window generated by network management system 200 depicting additional details concerning encrypted tunnel 2 (ET2). As described above, network management system 200 is able to fuse Red-side flows to Black-side flows by determining the Red-side and Black-side IP and/or MAC addresses of INEs. As such, network management system 200 stores information concerning what individual Red-side flows are contained within each Black-side tunnel (e.g., ET2). Accordingly, network management system 200 may be further configured to display an additional window 504 that shows information concerning individual flows (e.g., Red-side) flows contained within a particular encrypted tunnel.

As shown in FIG. 6, network management system 200 may depict information concerning each of the individual data flows contained within ET2. For example, ET2 may include three individual flows X, Y and Z. For each of the individual flows, network management system 200 may display a graph indicating the amount of traffic each of the individual flows contributes to the overall traffic represented by ET2. Network management system 200 may display additional information concerning the flows including the Red-side origination IP address (ORIG IP), the Red-side destination IP address (DEST IP), and the protocol used for each of the data flows (e.g., RTP, HTTP, ICMP, etc.).

Figure 7:
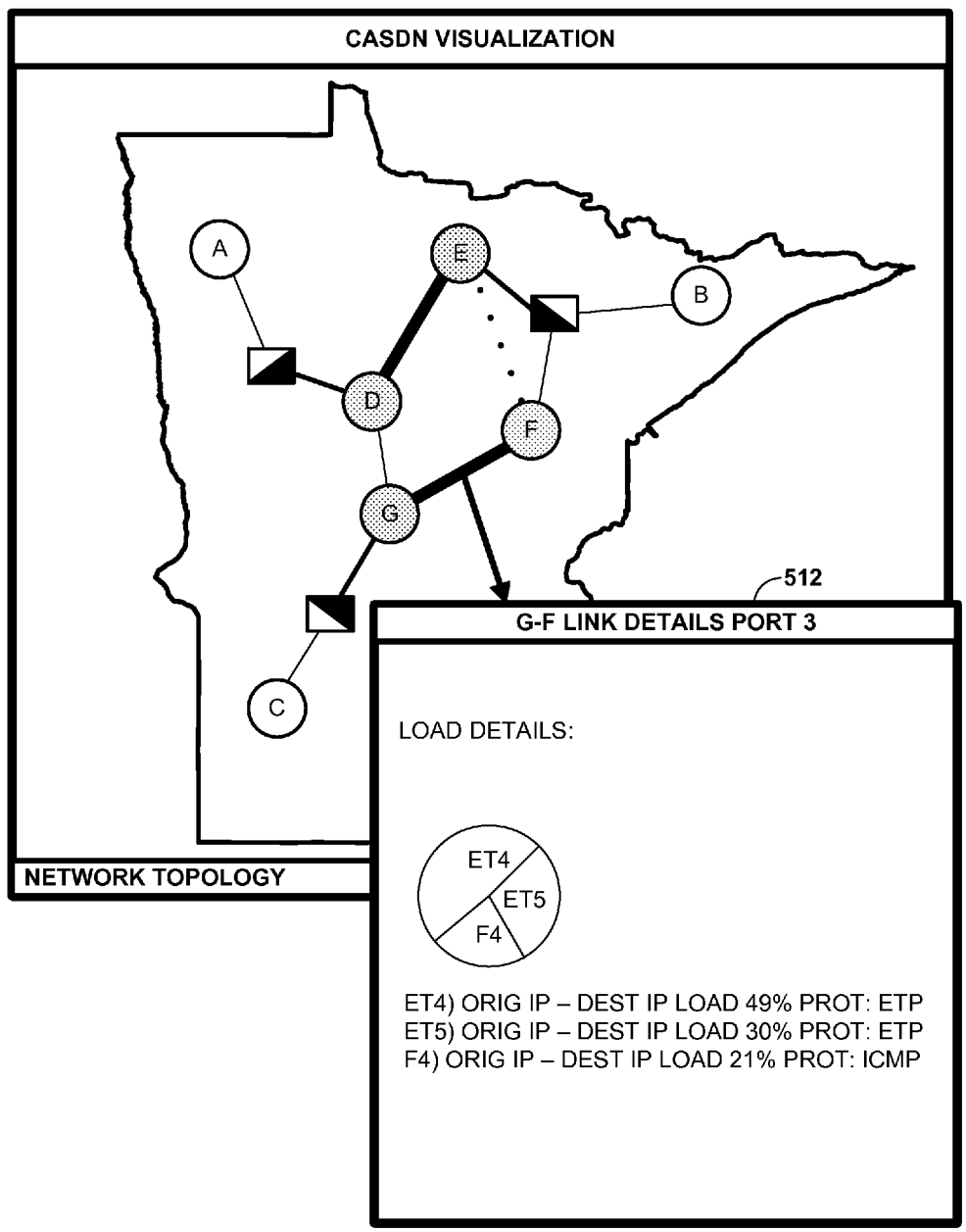
FIG. 7 is a conceptual diagram illustrating another example user interface generated by a network management system using the techniques of this disclosure.

In addition to providing additional drill-down information for each of the network elements shown in visualization window 500, network management system 200 may also cause the links between network elements to be selectable, and to display additional information concerning data flows currently utilizing the selected link. FIG. 7 shows an example window 512 generated by network management system 200 that displays the data flows currently detected on the data link between router G and router F. In the example of FIG. 7, network management system 200 causes window 512 to depict three data flows (ET4, ET5, and F4) currently using the link. Network management system 200 may cause various information concerning each of the data flows to be displayed, including, for example, a graph showing the percentage traffic of each data flow relative to the entire traffic of the link, the origination IP address of the data flow, the destination address of the data flow, and the protocol used for each data flow. For example, ET4 and ET5 may use an encrypted tunnel protocol (ETP) which may be one of the following:

IPsec (Internet Protocol Security), VPN (Virtual private network), GRE (Generic Routing Encapsulation), L2TP (Layer 2 Tunneling Protocol), SSH Tunnel. While F4 may use internet control message protocol (ICMP) or any other TCP/IP protocol. Like the example of FIG. 6, network management system 200 may cause each of the data flows in window 512 to be selectable, such that additional details concerning a particular data flow may be displayed. For example, if an encrypted tunnel data flow is selected, network management system 200 may cause an additional drill-down window (e.g., window 504 of FIG. 6) to be displayed showing individual flows contained within the encrypted tunnel.

Network management system 200 is not limited to showing IP and traffic information concerning network elements, links, encrypted tunnels and data flows. Network management system 200 may be further configured to correlate, manipulate, and display any network or situational awareness information gathered by the network sensors and made available to network management system 200. As other examples, network management system 200 may be configured to display computing node data (e.g., user, process and CPU data), platform status data (vehicle position, fuel status, condition, etc.) or other context data (e.g., mission data, target location data, etc.). As other examples, network management system 200 may be configured to display a list of origination IP addresses that are currently producing the most traffic (e.g., a Top X data flows display). Network management system 200 may make each of the origination IP addresses selectable such that information may be displayed showing the data flows being sent from the selected origination IP address. Network management system 200 may make each of these data flows selectable as well, such that additional information specific to each data flow may be displayed. For example, if a particular data flow is an encrypted tunnel, selection of the encrypted tunnel may cause network management system 200 to display information concerning each of the individual flows in the encrypted tunnel (e.g., see FIG. 6). Other examples beyond those described above, include being able to set the colors of network element to depict the amount of CPU use on the node, or the border of an network element to be thick or thin or solid or dashed to depict the number of applications or connections or users on a node. Or a search capability to grey all nodes and links but highlight links or nodes that involve traffic, data, or connection from one specific IP or MAC.

Figure 8:
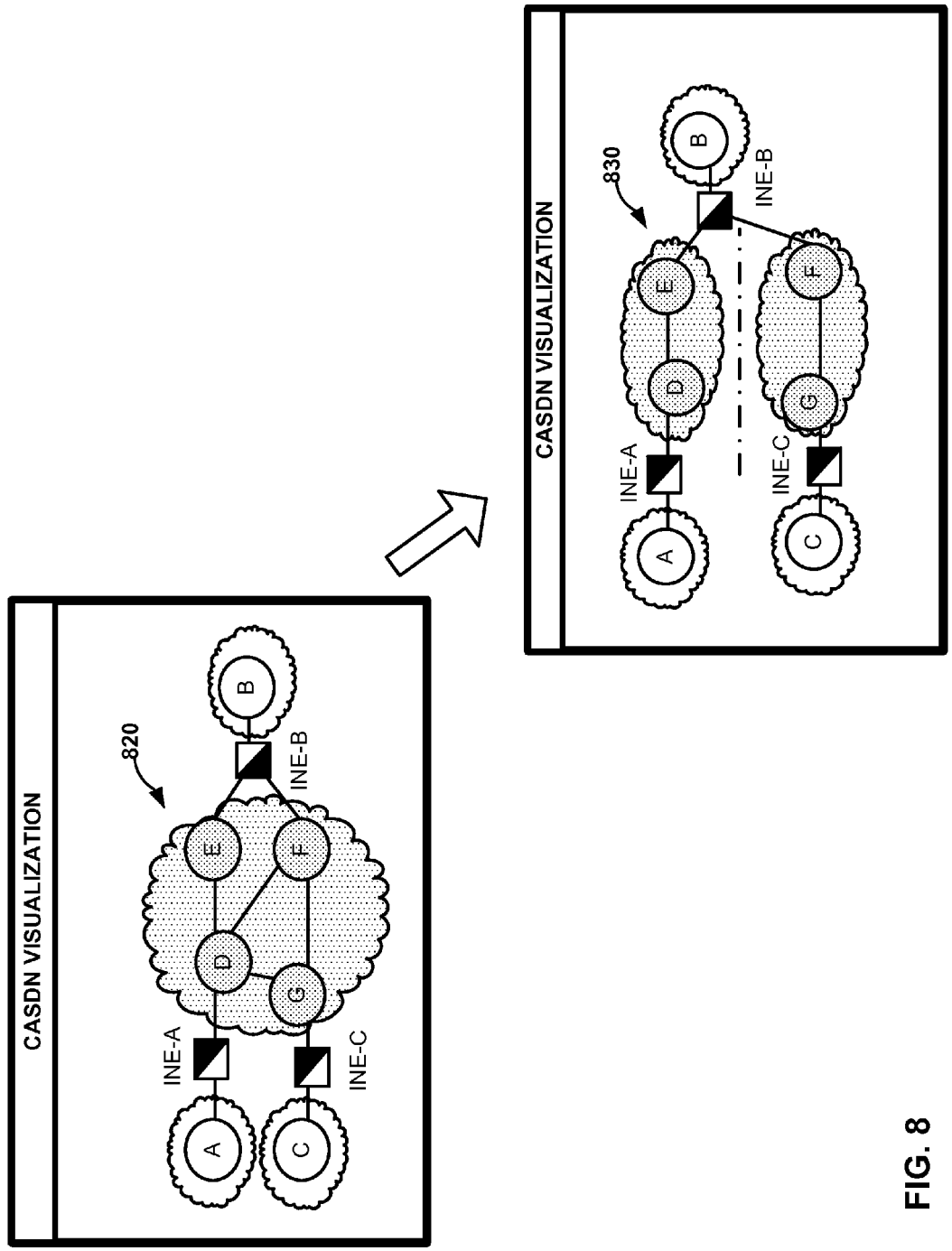
FIG. 8 is a conceptual diagram showing a user interface depicting a crypto-partitioned network experiencing broken links.

As another example, network management system 200 may include visualization tools to detect and route around broken links. FIG. 8 is a conceptual diagram showing a user interface depicting a crypto-partitioned network experiencing broken links. In FIG. 8, network management system 200 initially displays a crypto-partitioned network 820. Network management system 200 displays links in crypto-partitioned network 820 with solid lines, indicating that all links are available. As such, devices using crypto-partitioned network 820 are able to send data from Red network A to Red network C using routers D and G, or using routers D, F and G.

In one example, network management system 200, through the network information gathered from network sensors in the Black network, detects that links are broken between routers D and G, and between routers D and F. In this situation, network management system 200 may be configured to change the visualization and now display crypto-partitioned network 830 with a dashed line showing a break in previously-used links between router D and routers G and F. The displayed break in the link shows that there is no longer a path from point A through routers D-G to Red network C. Using conventional network management techniques for crypto-partitioned networks, it would no longer be possible to send data from Red network A to Red network C, as no direct connection exists through routers D-G for INE-A to reach INE-C. Furthermore, conventional network management techniques applied to crypto-partitioned networks do not allow for routing past INEs, therefore, visualization of any Black or Red networks past an INE are unavailable.

However, using the techniques of this disclosure, network management system 200 is able to create a visualization of the topology of the entire crypto-partitioned network. Based on the detection of the broken link, and the understanding of the network topology, network management system 200 may automatically reroute traffic from point A to point C to go through point B. As such, the techniques of this disclosure allow routing of data past INEs and through other Red networks. In a similar way, disconnected Black networks, can be rerouted if additional one-way guard nodes are available to send data onto a Red Network to get to an interim NSC, then that NSC can forward the data to the "Master" NSC through the Red-side. Therefore, the ability to map and visualize the entire network, even when major parts are disconnected but a Red-side path exists, allows network management system 200 to configure routers in Red-side enclaves to route all (or selected) traffic through these new routes.

Another network management function that may be implemented using the techniques of this disclosure is a traffic optimizer for INEs. Small packet protocols (e.g., VOIP, chat, etc.) are inefficient when used with INEs. Each packet only contains a small amount of data, and each packet may be encrypted. This disclosure proposes using the network information gathered by the network sensors in both the Red and Black networks to group packets from data streams to more efficiently use the bandwidth of the INE. In particular, this disclosure proposes to use network information that indicates the context of the packet to make grouping decisions. Example context information may include the protocol type of the data packet (e.g., HTTP, VOIP, RTP, etc.), source, destination, and priority. One or more of the contexts may be used for grouping data packets. For example, data packets having the same communication protocol may be grouped, data packets having the same destination address may be grouped, data packets having the same source address may be grouped, data packets having the same priority may be grouped, or a combination of some or all of the listed criteria may be used to group packets.

Figure 9:
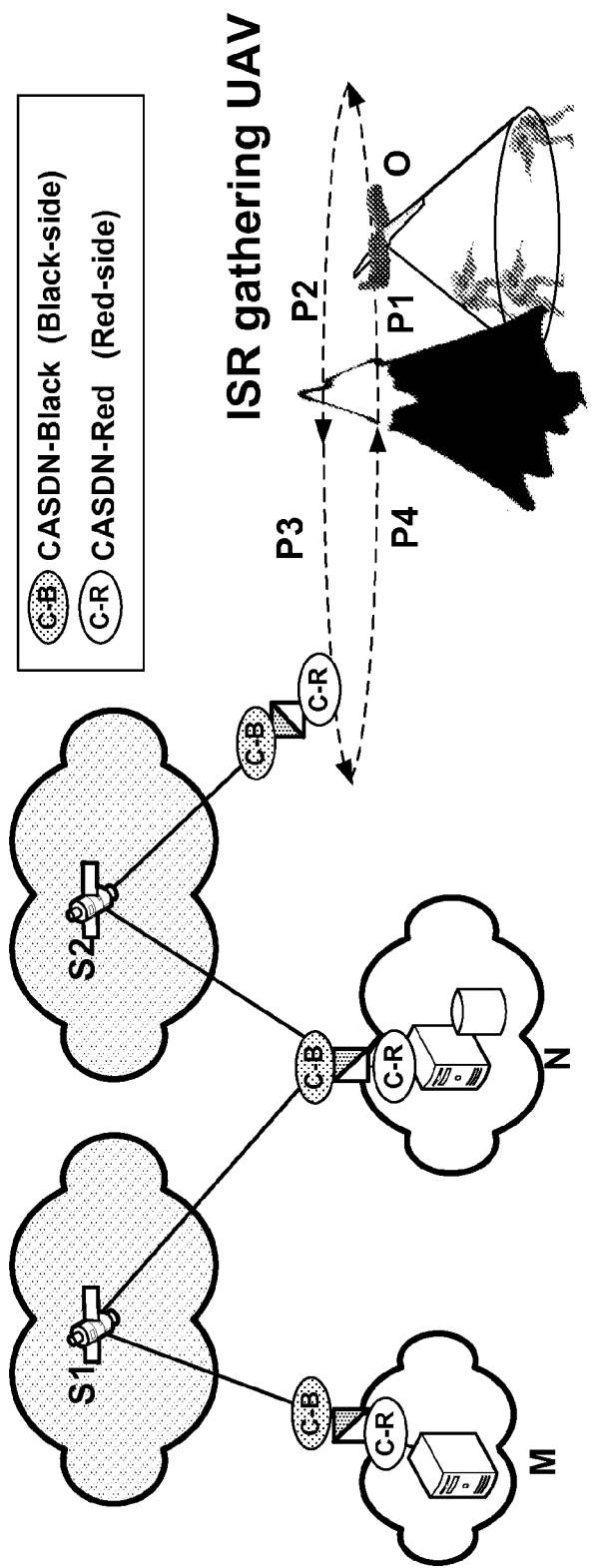
FIG. 9 is a conceptual diagram showing a scenario where data grouping and caching techniques are used.

FIG. 9 is a conceptual diagram showing a scenario where data grouping and caching techniques are used. In the scenario shown in FIG. 9, Red networks M, N and O all configured to employ the network management techniques of this disclosure described above to form a visualization of a cross-domain network topology. The CASDN-Black (C-B) and CASDN-Red (C-R) devices depicted in FIG. 9 are meant to generally represent the respective Black-side and Red-side network sensors, network sensor collectors, databases, one-way guards, and network management system elements depicted in FIG. 2.

Red network M may represent a command center in the continental United States. Red network N may represent a military base in the field, while Red network O may represent the communication equipment on board an aircraft circling above a battlefield or engagement. Red networks M, N, and O communicate to each other through two untrusted communication satellites S1 and S2.

In the scenario in FIG. 9, the aircraft representing Red network O is gathering intelligence data and network management data. The flight path of the aircraft around a mountain causes intermittent broken links with satellite S2. For example, from point P1 to point P2, the aircraft is unable to communicate with satellite S2, but from point P3 to point P4, the aircraft is able to communicate with satellite S2. At either Red network M or Red network N, using network management system 200 and the visualization tools described in this disclosure, the recurring pattern of active and broken links between the aircraft and satellite S2 would be detected and visualized. Based on this detection, the network management system 200 may be configured to instruct the aircraft to cache any data (from CASDN and/or other applications) gathered from point P1 to point P2, and only to transmit data while traveling between point P3 and P4.

Figure 10:
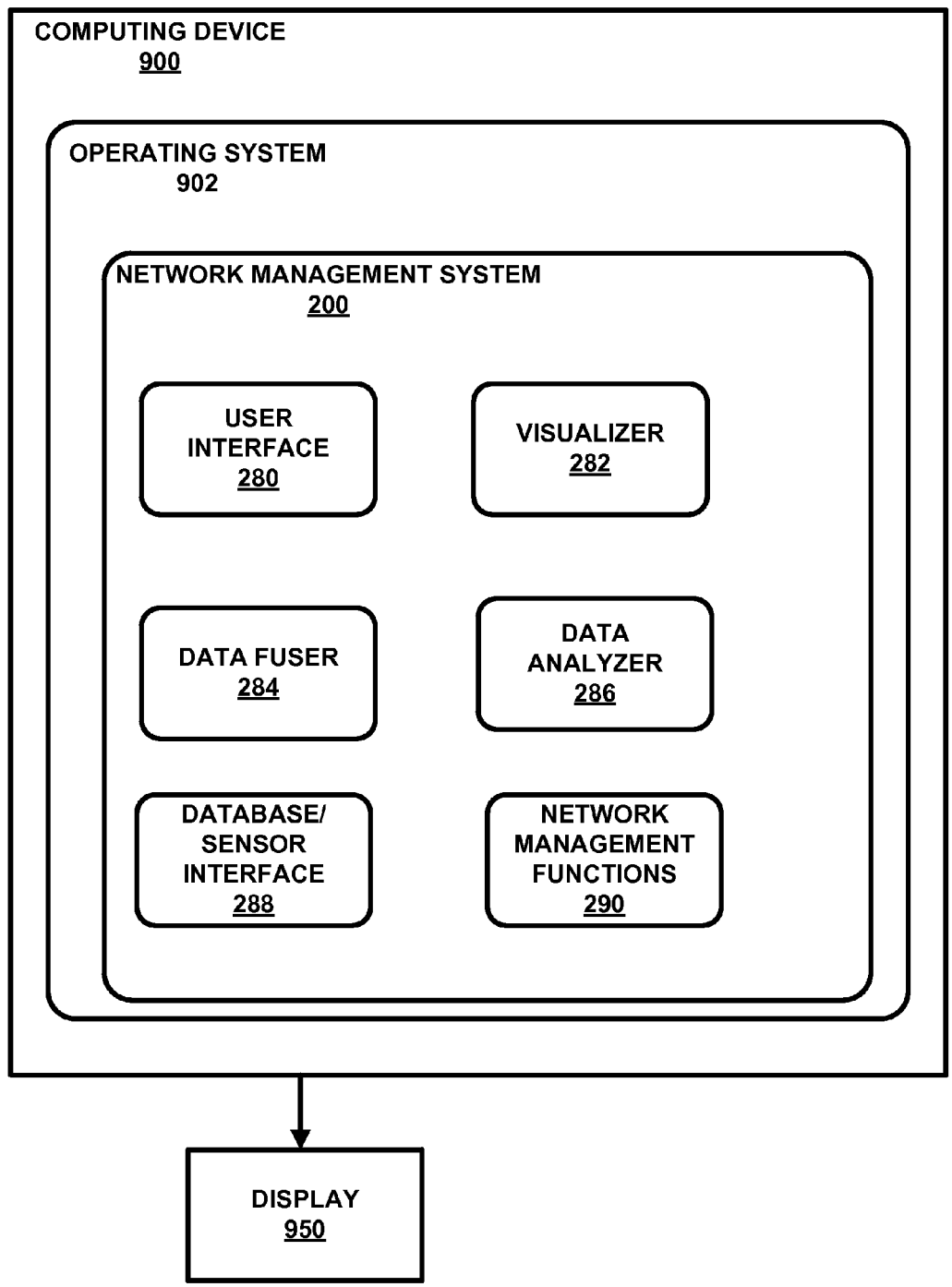
FIG. 10 is a block diagram showing an example implementation of a network management system.

FIG. 10 is a block diagram showing an example implementation of network management system 200. As shown in FIG. 10, network management system 200 may be implemented as a software program executing within operating system 902 on computing device 900. Computing device 900 may be any type of device capable of executing software with a programmable processor (e.g., a central processing unit (CPU)). Computing device 900 may be, for example, an INE, a router, a laptop computer, a desktop computer, a mobile computer, or a server. Preferably, the computing device 900 is configured to communicate with and cause display 950 to display a user interface created by network management system 200. Note that in some examples, display 950 may be integrated with computing device 900, while in other examples display 950 may be separate from computing device 900.

Computing device 900 may be configured to execute an operating system 902, such as Unix, Linux, Microsoft Windows, or the like. Network management system 200 may be configured to operate within operating system 902. Network management system 200 may comprise one or more software modules configured to execute the techniques of this disclosure described above. For example, network management system 200 may include a user interface module 280 for generating a user interface for interacting with the network management system. For example, user interface module 280 may be configured to generate the windows shown in FIGS. 5-8.

Database/sensor interface 288 may be configured to communicate with network sensors, network sensor collectors, and/or databases to access and store the network platform and situational awareness information collected in both Red and Black networks. Data fuser module 284 may be configured to use the gathered network information to fuse the network information from the Black and Red networks to build a network topology of a crypto-partitioned network using the techniques discussed above with reference to FIGS. 2-4. Visualizer 282 may use the network topology generated by data fuser 284, along with other graphical elements (e.g., a digital map) to generate a visualization of the network topology, platform conditions and situational awareness to be displayed by user interface 280. Visualizer 282 may be configured to display network elements, link lines with varying widths representing traffic amounts, link status, and other information concerning network, user, application, platform, and situation data using the techniques described above with reference to FIGS. 5-8.

Data analyzer module 286 may be configured to perform analysis on the network information gathered by database/sensor interface 288. Such analysis may be computing a list of the origination IP addresses currently generating the most traffic, ranking current traffic in the crypto-partitioned network by communication protocol, correlating Red-side and Black-side data, identifying communication routes that have the most available bandwidth, and the like. Network management functions module 290 may be configured to perform network management functions other than visualization and may utilize the output of data analyzer module 286. For example, network management functions module 290 may be configured to perform traffic rerouting and traffic optimization techniques, such as those described above with reference to FIGS. 8-9. As other examples network management functions module 290 may be configured to perform analysis of system wide fuel availability, vehicle status or targeting conditions.

Figure 11:
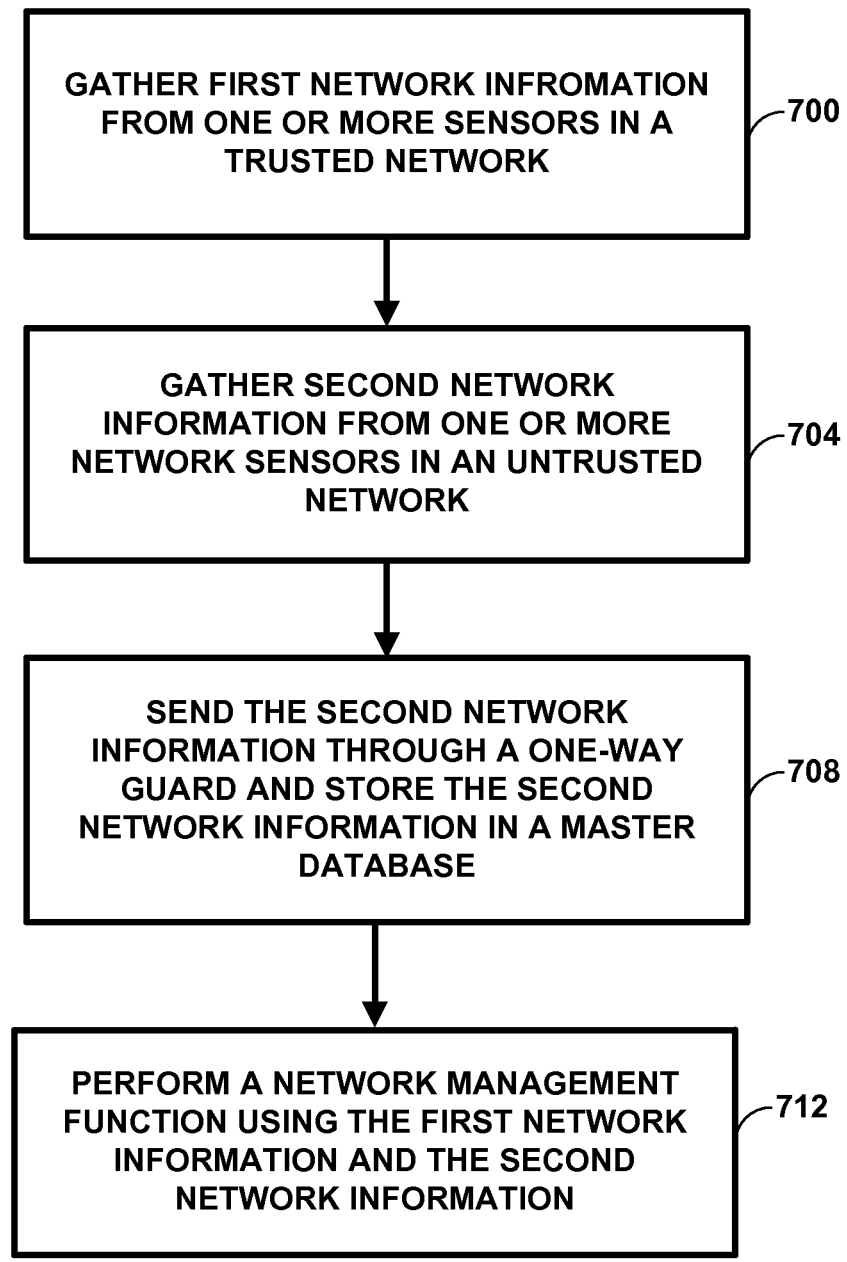
FIG. 11 is a flowchart showing an example method of the disclosure.

FIG. 11 is a flowchart showing an example method of providing network management according to the techniques of this disclosure. The method may include gathering first network, platform and situation information from one or more network sensors in a trusted network (700). In one example, the network sensors store the first network information from the trusted network in a first database. The method may further include gathering second network information from one or more network sensors in an untrusted network (704). The network sensors may store the second information data from the untrusted network in a second database. The method may further include sending the second network information through a one-way guard and storing the second network information in a "master" database (708), and performing a network management function using the first network information and the second network information (712), this management function may include sending data from the Network management system 200 through a one-way guard to make network or system configuration changes throughout a red and black network.

In one example of the disclosure, the one or more network sensors in the trusted network and the one or more network sensors in the untrusted network gather information from at least one of a probe and an interface that is communicatively coupled with a network element. The network element may be one or more of an inline network encryptor, a router, a switch, a compute node, a vehicle or platform, and other network elements. The network or situation information includes one or more of network element IP address, network element position, network element link status, amount of traffic at the network element, link bandwidth between network elements, traffic priority of flows, application name sending and/or receiving traffic, username using the application, and other data about compute nodes (e.g., user, process and CPU data), or platform (vehicle position, fuel status, condition, etc.), or other context (e.g., mission data, target location data, etc.) in the network.

In another example of the disclosure, performing the network management function comprises performing a visualization function, the visualization function showing one or more of a topology of the untrusted network and the trusted network, network element relative position, network element location, link status, amount of traffic, platform status and condition and the like. Performing the visualization function may comprise fusing the first network information with the second network information.

In another example of the disclosure, performing the network management function comprises detecting a broken link between two network elements based on the network information, and rerouting data packets in response to detecting the broken link.

In another example of the disclosure, performing the network management function comprises grouping data packets based on a context of the data packet and the network information. In one example, the network information includes a topology of the network elements, and a link status of the network elements, and grouping data packets comprises caching data packets during a period when the link status between two network elements indicates an inactive link, and sending new data packets and the cached data packets during a period when the link status between two network elements indicates an active link.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for providing network management, the method comprising:
   gathering first network information from one or more network sensors in a trusted network;
   gathering second network information from one or more network sensors in an untrusted network;
   sending the second network information through a one-way guard and storing the second network information in a database; and
   performing a network management function using the first network information and the second network information.

2. The method of claim 1, wherein the one or more network sensors in the trusted network and the one or more network sensors in the untrusted network gather information from at least one of a probe and an interface that is communicatively coupled with a network element.

3. The method of claim 2, wherein the network element may be one or more of an inline network encryptor, a router, and a switch.

4. The method of claim 2, wherein the network information includes one or more of network element IP address, network element position, network element link status, amount of traffic at the network element, link bandwidth between network elements, traffic priority of flows, application name sending traffic, application name receiving traffic, and username using the application.

5. The method of claim 2, wherein the network information includes one or more of computing node data, platform status data, and context data.

6. The method of claim 2, wherein performing the network management function comprises performing a visualization function, the visualization function showing one or more of a topology of the untrusted network and the trusted network, network element relative position, network element location, link status, amount of traffic, number of flows, relative sizes of flows, breakdown of traffic types and subtotals, and relative size of traffic for each type.

7. The method of claim 6, wherein performing the visualization function comprises fusing the first network information with the second network information.

8. The method of claim 2, wherein performing the network management function comprises:
   detecting a broken link between two network elements based on the network information; and
   rerouting data packets in response to detecting the broken link.

9. The method of claim 2, wherein the performing the network management function comprises:
   grouping data packets based on a context of the data packet and the network information.

10. The method of claim 9, wherein the network information includes a topology of the network elements, and a link status of the network elements, and wherein grouping data packets comprises:
    caching data packets during a period when the link status between two network elements indicates an inactive link; and sending new data packets and the cached data packets during a period when the link status between two network elements indicates an active link.

11. A system including crypto-partitioned networks configured for cross-domain network management, the system comprising:
one or more first network sensors in a trusted network configured to gather first network information;
a first network sensor collector configured to store the first network information from the trusted network in a first database;
one or more second network sensors in an untrusted network configured to gather second network information;
a second network sensor collector configured to store the second information data from the untrusted network in a second database;
a one-way guard configured to send the second network information from the second database to the first database; and
a visualizer configured to perform a network management function using the first network information and the second network information.

12. The system of claim 11, further comprising:
at least one of a probe and an interface communicatively coupled with a network element, wherein the one or more network sensors in the trusted network and the one or more network sensors in the untrusted network are configured to gather information from at least one of the probe and the interfaces.

13. The system of claim 12, wherein the network element may be one or more of an inline network encryptor, a router, and a switch.

14. The system of claim 12, wherein the visualizer is further configured to perform a visualization function, the visualization function showing one or more of a topology of the untrusted network and the trusted network, network element relative position, network element location, link status, amount of traffic, number of flows, relative sizes of flows, breakdown of traffic types and subtotals, and relative size of traffic for each type.

15. The system of claim 14, wherein the visualizer is further configured to fuse the first network information with the second network information.

16. The system of claim 12, wherein the visualizer is further configured to:
detect a broken link between two network elements based on the network information; and
reroute data packets in response to detecting the broken link.

17. The system of claim 12, wherein the visualizer is further configured to:
group data packets based on a context of the data packet and the network information.

18. The system of claim 17, wherein the network information includes a topology of the network elements, and a link status of the network elements, and wherein the visualizer is further configured to:
cache data packets during a period when the link status between two network elements indicates an inactive link; and
send new data packets and the cached data packets during a period when the link status between two network elements indicates an active link.

19. An apparatus for network management comprising:
a computing device located in a trusted network, the computing device executing a visualizer, the visualizer configured to:
access first network information from a trusted network, the first network information gathered by one or more network sensors in the trusted network;
access second network information from an untrusted network, the second network information gathered by one or more network sensors in the untrusted network, wherein at least one of the first network information and second network information is accessed through a one-way guard; and
fuse the first network information from the trusted network with the second network information from the untrusted network to form a cross-domain network topology.

20. The apparatus of claim 19, wherein the first network information and the second network information includes one or more of network element IP address, network element position, network element link status, amount of traffic at the network element, link bandwidth between network elements, traffic priority of flows, application name sending traffic, application name receiving traffic, and username using the application.

* * * * *